United States Patent [19]
Luo et al.

[11] Patent Number: 5,481,488
[45] Date of Patent: Jan. 2, 1996

[54] BLOCK FLOATING POINT MECHANISM FOR FAST FOURIER TRANSFORM PROCESSOR

[75] Inventors: Wenzhe Luo; Jiasheng Xu, both of Beijing, China

[73] Assignee: United Microelectronics Corporation, Taiwan

[21] Appl. No.: 328,713

[22] Filed: Oct. 21, 1994

[51] Int. Cl.⁶ ............................ G06F 17/14; G06F 15/00; G06F 7/38
[52] U.S. Cl. ............................................ 364/725; 726/745
[58] Field of Search ........................ 364/715.04, 725, 364/726, 736, 745, 748

[56] References Cited

U.S. PATENT DOCUMENTS

| | | | |
|---|---|---|---|
| 4,138,730 | 2/1979 | Ali | 364/726 |
| 4,319,325 | 3/1982 | Hoff, Jr. et al. | 364/736 |
| 4,407,018 | 9/1983 | Kanemasa | 364/736 |
| 4,825,400 | 4/1989 | Simoncic et al. | 364/748 |
| 5,034,910 | 7/1991 | Whelchel et al. | 364/726 |
| 5,303,172 | 4/1994 | Magar et al. | 364/726 |

*Primary Examiner*—Roy N. Envall, Jr.
*Assistant Examiner*—Chuong D. Ngo
*Attorney, Agent, or Firm*—Curtis, Morris & Safford

[57] ABSTRACT

A block floating point mechanism for a Fast Fourier Transform processor utilizes a pipelined butterfly processor to receive the source data to be computed, to perform the butterfly computations, and to output the resultant data. A shifter is coupled to the pipelined butterfly processor to receive the resultant data for shifting the resultant data by the largest overflow bit number occurring in the previous stage of butterfly computations. An overflow detector is coupled to the shifter to receive the shifted resultant data for detecting the largest overflow bit number occurring in this stage of butterfly computations, and for sending the detected largest overflow bit number to the shifter.

1 Claim, 2 Drawing Sheets

BLOCK FLOATING POINT MECHANISM FOR FAST FOURIER TRANSFORM PROCESSOR

BACKGROUND OF THE INVENTION

The present invention relates to an improved block floating point mechanism for an FFT (Fast Fourier Transform) processor.

The FFT is probably one of the most important algorithms in digital signal-processing (DSP) applications. There are two approaches for computing the transform: software implemented on a programmable DSP, and dedicated FFT processor development. Real-time DSP favors the use of the latter, which offers parallel processing capability.

One of the important parts of an FFT processor hardware system is the butterfly processor for arithmetic operation. The FFT butterfly computation operates on data in sets of r points, where r is called the radix. A P-point FFT uses P/r butterfly units per stage for $\log_r P$ stages. The computational result of one butterfly stage is the input data of the next butterfly stage. For example, a signal flow diagram of a basic radix-2 butterfly unit is illustrated in FIG. 1, and a signal flow diagram of an 8-point radix-2 FFT processor is illustrated in FIG. 2. The relationship between the inputs A, B and the outputs A', B' of the radix-2 butterfly unit is expressed as:

$$A'=A+BW_N^k$$

$$B'=A-BW_N^k$$

where $W_N^k$ is the so-called "twiddle" factor, and all parameters A, B, A', B', and $W_N^k$ are complex variables. The butterfly computation of the 8-point FFT is performed by three butterfly stages I, II, and III, and each stage includes four butterfly units, as shown in FIG. 2. The computational requirements of one butterfly unit are one complex multiply, one complex add, and one complex subtract. As is known, these complex computations have to be changed into real computations, including three real additions, three real subtractions, and four real multiplications.

The block floating point algorithm is widely used in butterfly computation due to its high-speed processing for blocked data. As described above, the butterfly unit includes several multiply, add, and subtract operations, and thus an increase of data range may occur, resulting in an overflow. However, in general. The butterfly processor is made up of fixed-point multipliers and adders. Therefore, guard bits must be provided in the butterfly processor to prevent an overflow error occurring in the computational result of a certain butterfly computation. In addition, the overflow has to be detected in order to appropriately shift the overflowed data, whereby the overflows will not accumulate during multiple-stage butterfly computations. In this manner, the overflow bits will not eventually exceed the guard bits and cause errors.

Since the butterfly units in the same butterfly stage have different data inputs, the overflow bit number a computational result may be different in each different butterfly unit. For example, two-bit overflow, one-bit overflow, or non-overflow may happen in a radix-2 butterfly unit. Because all decimal points of the computing data in every one butterfly stage have to be aligned when the fixed-point butterfly processor is used, these different overflows cannot be shifted individually by different bits. Therefore, the overflows of all resultant data from the butterfly units in the same stage have to be detected to obtain the largest overflow bit number. These resultant data have to be shifted by the largest overflow bits before entering the next-stage butterfly computation. This processing method is called the block floating point algorithm.

A conventional mechanism for implementing the block floating point algorithm is illustrated in FIG. 3. The block floating point mechanism includes a shifter 10, a butterfly processor 20 coupled to the shifter 10, and an overflow detector 30 coupled to the butterfly processor 20 and the shifter 10. The shifter 10 receives the source data to be computed from the memory. The source data for the first-stage butterfly computations are not shifted by the shifter 10, but are sent to the butterfly processor 20 directly. The butterfly processor 20 performs the butterfly computations, and sends out the resultant data at its output. The overflow detector 30 coupled to the output of the butterfly processor 20 detects the overflow of all resultant data. When the final butterfly computation is completed, and the final resultant data is detected by the overflow detector 30, the largest overflow bit number $M_1$ is obtained and sent to the shifter 10. The resultant data of the first-stage butterfly Computations are sent to the memory, and act as the source data for the second-stage butterfly computations. The shifter 10 retrieves the source data for the second-stage butterfly computations from the memory, and shifts them by $M_1$ bit(s). The shifted data are sent to the butterfly processor 20 for butterfly computations, and the resultant data are also detected by the overflow detector 30 to obtain the largest overflow bit number $M_2$ which is in turn sent to the shifter 10. The resultant data of the second-stage butterfly computations are sent to the memory, and act as the source data for the third-stage butterfly computations. In sum, During the k-stage butterfly computations, the shifter 10 retrieves the resultant data of the (k−1)-stage butterfly computations from the memory, and shifts them by $M_{k-1}$ bit(s) to ensure computational correctness. The shifted data are then sent to the butterfly processor 20 for the k-stage butterfly computations, and the resultant data are also detected by the overflow detector 30 to obtain the largest overflow bit number $M_k$ which is in turn sent to the shifter 10. The resultant data of the k-stage butterfly computations are sent to the memory, and act as the source data for the (k+1)-stage butterfly computations. These processes repeat until the butterfly computations for all stages are completed. To avoid the overflows causing computational errors, $M_g$ guard bits are provided in the butterfly processor 20, and the $M_g$ is not smaller than the $M_k$. Suppose that the data path width of the butterfly processor 20 is m bits. The bit numbers of the processing binary data in the block floating point mechanism of FIG. 3 change as follows:

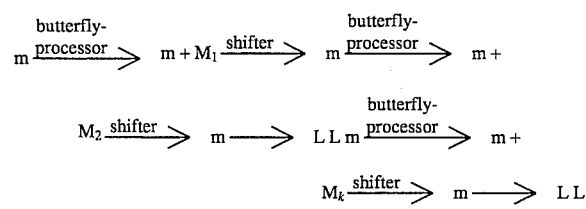

According to the conventional block floating point mechanism described above, the first butterfly computation for the k-stage cannot start until the final butterfly computation for the (k−1)-stage is completed. This will result in several pipeline wait cycles if the butterfly processor 20 is implemented by the pipeline technology. More finely pipelined butterfly processor causes more waiting times, and thus an additional diminution of computational efficiency.

SUMMARY OF THE INVENTION

The primary object of the present invention is to provide an improved block floating point mechanism for an FFT processor, which can eliminate the above-described pipeline waiting problem.

In accordance with the present invention, a block floating point mechanism for an FFT processor which is used to perform a plurality of stages of butterfly computations and has a memory therein, comprises:

a pipelined butterfly processor receiving the source data to be computed from the memory, performing the butterfly computations, and outputting the resultant data;

a shifter coupled to the pipelined butterfly processor to receive the resultant data for shifting the resultant data by the largest overflow bit number occurring in the previous stage of butterfly computations; and an overflow detector coupled to the shifter to receive the shifted resultant data for detecting the largest overflow bit number occurring in this stage of butterfly computations, and for sending the detected largest overflow bit number to the shifter, the shifted resultant data being sent to the memory by the overflow detector to act as the source data for the butterfly computations of the next stage.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
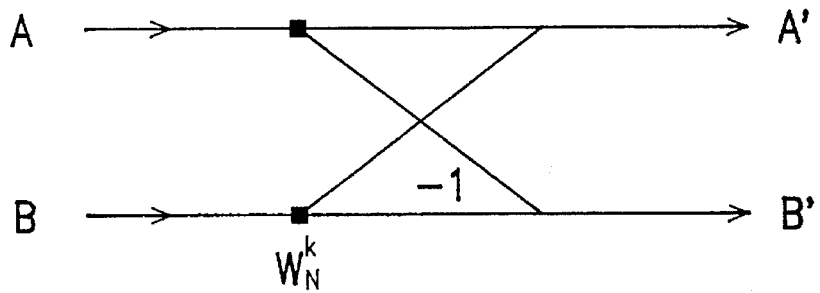
FIG. 1 is a well-known signal flow diagram of a basic radix-2 butterfly unit.
Figure 2:
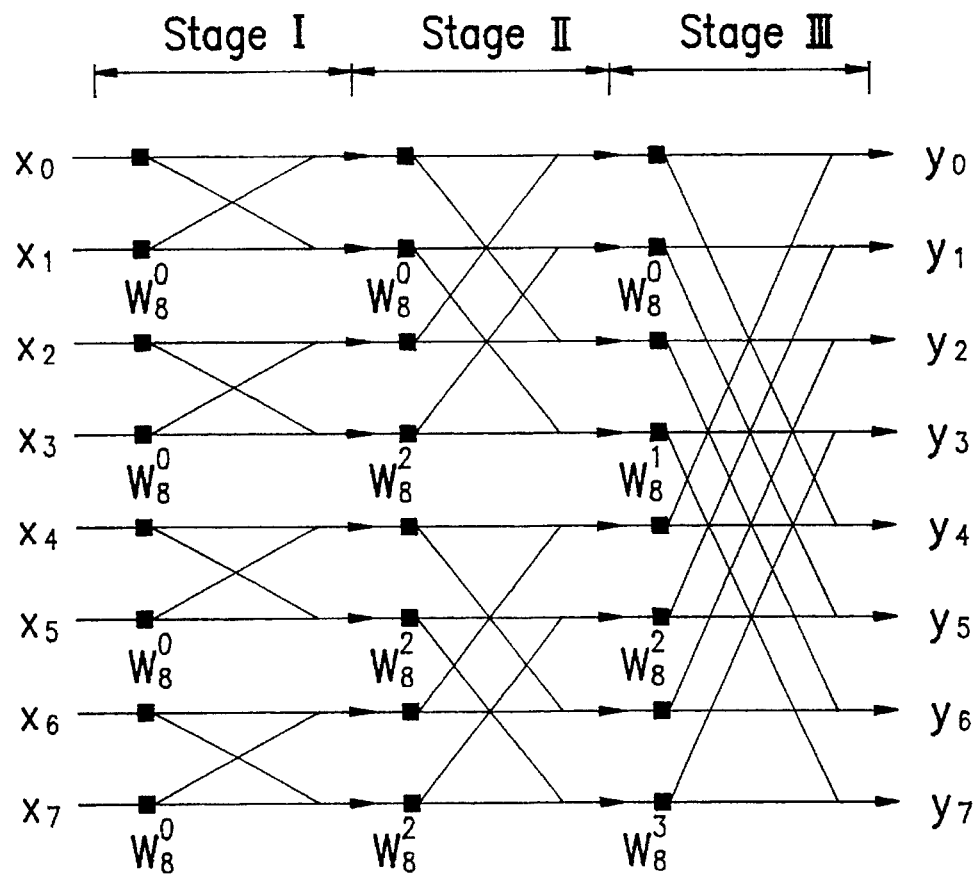
FIG. 2 is a well-known signal flow diagram of a 8-point radix-2 FFT processor.
Figure 3:
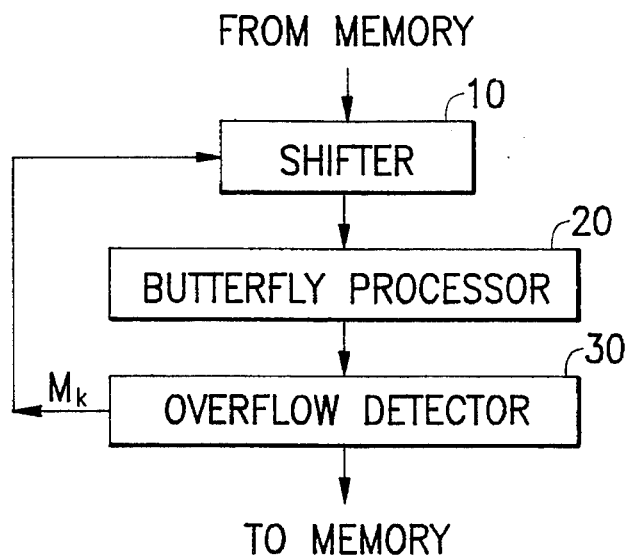
FIG. 3 is a block diagram of a conventional block floating point mechanism for an FFT processor.
Figure 5:
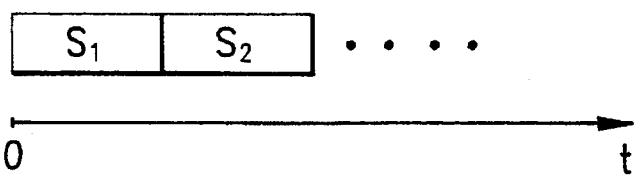
FIG. 5 is a schematic timing chart illustrating the data flow at the output of the pipelined butterfly processor shown in FIG. 4.

Referring now to FIG. 1, there is shown an improved block floating point mechanism for an FFT processor according to one preferred embodiment of the present invention. The improved block floating point mechanism includes a pipelined butterfly processor 50, a shifter 60 coupled to the pipelined butterfly processor 50, and an overflow detector 70 Coupled to the shifter 60. In operation, the pipelined butterfly processor 50 receives from the memory the source data to be computed for the first-stage butterfly computations, performs the butterfly computations, and sends out the resultant data sequence $S_1$ at its output sequentially. The resultant data sequence $S_1$ of the first-stage butterfly computations is not shifted when passing through the shifter 60, but is sent directly to the overflow detector 70. The overflow detector 70 detects the overflows of all resultant data. When the final butterfly computation is completed, and the final resultant data is detected by the overflow detector 70, the largest overflow bit number $M_1$ is obtained and sent to the shifter 60. The resultant data sequence $S_1$ of the first-stage butterfly computations is sent to the memory, and acts as the source data for the second-stage butterfly computations. The pipelined butterfly processor 50 retrieves the source data sequence $S_1$ for the second-stage butterfly computations from the memory, and performs the butterfly computations directly without any shifting. In this manner, no pipeline waiting is necessary between the final butterfly computation for the first butterfly stage and the first butterfly computation for the second butterfly stage. That is to say, the tail end of the resultant data sequence $S_1$ of the first-stage butterfly computations is directly followed by the front end of the resultant data sequence $S_2$ of the second-stage butterfly computations in the data processing flow of the block floating point mechanism of the present invention. FIG. 5 schematically shows the timing relationship of the resultant data sequences generated at the output of the pipelined butterfly processor 50. As clearly seen in FIG. 5, the data flow of the sequences $S_1$ and $S_2$ has no gap.

The shifter 60 coupled to the output of the butterfly processor 50 shifts all resultant data of the second-stage butterfly computations by $M_1$ bit(s). As described above, the tail end of the data sequence $S_1$ of the first-stage butterfly computations is directly followed by the front end of the resultant data sequence $S_2$ of the second-stage butterfly computations. When the tail end of the sequence $S_1$ reaches the overflow detector 70, the front end of the sequence $S_2$ reaches the final pipeline stage of the pipelined butterfly processor 50. At this time, the largest overflow bit number $M_1$ is detected by the overflow detector 70. The largest overflow bit number $M_1$ is clocked into the register of the shifter 60, which is used to control the shifting bits, during the next clock cycle. Therefore, the sequence $S_2$ can be appropriately shifted by $M_1$ bit(s) when reaching the shifter 60.

Figure 4:
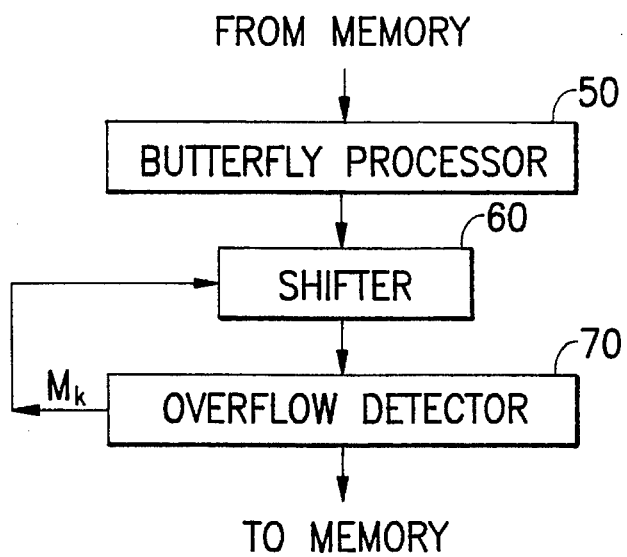
FIG. 4 is a block diagram of a block floating point mechanism for an FFT processor, according to one preferred embodiment of the present invention.

The shifted data sequence $S_2$ is sent to the overflow detector 70 in order to detect the largest overflow bit number $M_2$ when the final butterfly computation for the second butterfly stage is completed. The $M_2$ is then sent to the shifter 60 for shifting the resultant data of the third-stage second-stage butterfly computations are sent to the memory, and act as the source data for the third-stage butterfly computations. In sum, During the k-stage butterfly computations, the pipelined butterfly processor 50 retrieves the shifted resultant data of the (k−1)-stage butterfly computations from the memory, directly performs the k-stage butterfly computations, and sends out the resultant data at its output. The shifter 60 coupled to the output of the butterfly processor 50 shifts the resultant data of the k-stage butterfly computations by $M_{k-1}$ bit(s). The shifted data are then detected by the overflow detector 30 to obtain the largest overflow bit number $M_k$ which is in turn sent to the shifter 10. The shifted resultant data of the k-stage butterfly computations are sent to the memory, and act as the source data for the (k+1)-stage butterfly computations. These processes repeat until the butterfly computations for all stages are completed. Suppose that the data path width of the pipelined butterfly processor 20 is m bits. The bit numbers of the processing binary data in the block floating point mechanism of FIG. 4 change as follows:

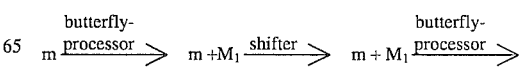

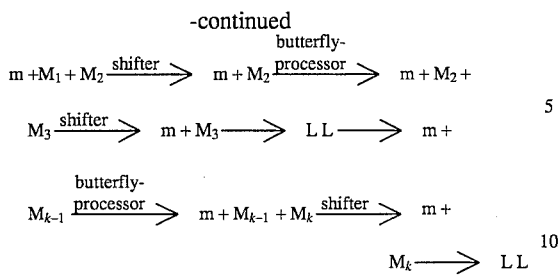

To avoid the overflows causing computational errors, $M_g$ guard bits are provided in the butterfly processor 20. In the present invention, more guard bits are needed to ensure that the butterfly computations for any two continuous butterfly stages will not cause any overflow errors. Therefore, the $M_g$ is not smaller than any $M_{k-1}+M_k$. According to the present invention, the k-stage butterfly computations do not need to wait for the overflow detecting result of the (k−1)-stage butterfly computations. Thus, interruptions of pipeline operation are avoided, and the butterfly computational efficiency is increased.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A block floating point mechanism for an FFT processor which is used to perform a plurality of stages of butterfly computations and has a memory therein, comprising:

a pipelined butterfly processor receiving source data to be computed from said memory, performing butterfly computations, and outputting resultant data;

a shifter coupled to said pipelined butterfly processor to receive the resultant data for shifting the resultant data by the largest overflow bit number occurring in the previous stage of butterfly computations; and an overflow detector coupled to said shifter to receive the shifted resultant data for detecting the largest overflow bit number occurring in this stage of butterfly computations, and for sending the detected largest overflow bit number to said shifter, the shifted resultant data being sent to said memory by said overflow detector to act as the source data for the butterfly computations of the next stage.

* * * * *